United States Patent
Wheatley, III et al.

(10) Patent No.: US 8,254,279 B2
(45) Date of Patent: Aug. 28, 2012

(54) ESTIMATION OF THERMAL NOISE AND RISE-OVER-THERMAL IN A WIRELESS COMMUNICATION SYSTEM

(75) Inventors: Charles E. Wheatley, III, Del Mar, CA (US); Avneesh Agrawal, San Diego, CA (US); Danlu Zhang, San Diego, CA (US); Sharad Deepak Sambhwani, San Diego, CA (US); Lu Yuan, Carlsbad, CA (US); Mehraban Iraninejad, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 12/107,013

(22) Filed: Apr. 21, 2008

(65) Prior Publication Data
US 2008/0267086 A1    Oct. 30, 2008

Related U.S. Application Data

(60) Provisional application No. 60/913,778, filed on Apr. 24, 2007.

(51) Int. Cl.
H04J 3/14 (2006.01)
H04W 4/00 (2009.01)

(52) U.S. Cl. .................. 370/252; 370/328
(58) Field of Classification Search .......... 370/252, 370/328
See application file for complete search history.

(56) References Cited

U.S. PATENT DOCUMENTS

| | | | |
|---|---|---|---|
| 3,824,597 A | 7/1974 | Berg | |
| 4,054,785 A * | 10/1977 | Lehmann | 708/405 |
| 5,734,967 A | 3/1998 | Kotzin et al. | |
| 5,952,834 A | 9/1999 | Buckley | |
| 6,036,351 A * | 3/2000 | Wagstaff | 708/321 |
| 6,317,600 B1 | 11/2001 | Salonaho et al. | |
| 6,397,041 B1 * | 5/2002 | Ballard et al. | 455/67.11 |

(Continued)

FOREIGN PATENT DOCUMENTS
EP    1708536 A2    10/2006
(Continued)

OTHER PUBLICATIONS

Specification of U.S. Appl. No. 60/852,955 to Lixin Cheng filed Oct. 19, 2006, pp. 1-7.*

(Continued)

Primary Examiner — Derrick Ferris
Assistant Examiner — Angel Brockman
(74) Attorney, Agent, or Firm — Charles Chesney

(57) ABSTRACT

Techniques for estimating thermal noise and rise-over-thermal (RoT) in a communication system are described. In an aspect, thermal noise in a sideband may be measured and used to estimate thermal noise in a signal band. In one design, received power in the sideband may be measured, e.g., by computing total power of FFT transform coefficients within the sideband. Thermal noise may be estimated based on (e.g., by filtering) the measured received power in the sideband. Received power in the signal band may also be measured. Total received power may be estimated based on (e.g., by filtering) the measured received power in the signal band. RoT may then be estimated based on the estimated thermal noise and the estimated total received power. The estimated RoT may be used to estimate an available load for a cell, which may be used to admit and/or schedule users in the cell.

29 Claims, 8 Drawing Sheets

U.S. PATENT DOCUMENTS

| | | | |
|---|---|---|---|
| 6,442,398 | B1 | 8/2002 | Padovani et al. |
| 6,577,875 | B1 | 6/2003 | Brouwer |
| 6,643,520 | B1 | 11/2003 | Park et al. |
| 6,731,620 | B1 | 5/2004 | Lim et al. |
| 7,042,966 | B1 * | 5/2006 | Lapaille et al. ............... 375/346 |
| 7,046,694 | B2 * | 5/2006 | Kumar ........................... 370/487 |
| 7,373,163 | B2 * | 5/2008 | Kim et al. ..................... 455/522 |
| 7,447,504 | B2 | 11/2008 | Lohr et al. |
| 2004/0022207 | A1 * | 2/2004 | Leung et al. .................. 370/321 |
| 2004/0121808 | A1 | 6/2004 | Hen et al. |
| 2004/0228349 | A1 | 11/2004 | Vrzic et al. |
| 2005/0026624 | A1 | 2/2005 | Gandhi et al. |
| 2005/0047365 | A1 * | 3/2005 | Hong et al. ................... 370/328 |
| 2005/0192042 | A1 | 9/2005 | Au et al. |
| 2005/0273320 | A1 * | 12/2005 | Yamaguchi et al. .......... 704/205 |
| 2006/0176983 | A1 * | 8/2006 | Wadsworth et al. .......... 375/343 |
| 2006/0211441 | A1 * | 9/2006 | Mese et al. .................... 455/522 |
| 2007/0202826 | A1 * | 8/2007 | Dean ............................. 455/230 |
| 2007/0237067 | A9 * | 10/2007 | Borran et al. ................. 370/208 |
| 2007/0270100 | A1 | 11/2007 | Agrawal et al. |
| 2008/0095277 | A1 * | 4/2008 | Cheng ........................... 375/340 |
| 2008/0198802 | A1 | 8/2008 | Zhang et al. |
| 2009/0088146 | A1 * | 4/2009 | Wigren et al. ................ 455/423 |

FOREIGN PATENT DOCUMENTS

| | | |
|---|---|---|
| JP | 2004312333 A | 11/2004 |
| JP | 2006345500 A | 12/2006 |
| JP | 2008535312 A | 8/2008 |
| KR | 1020040045102 | 6/2004 |
| KR | 20060041674 A | 5/2006 |
| RU | 2277300 C2 | 5/2006 |
| WO | WO0241528 | 5/2002 |
| WO | 03094395 | 11/2003 |
| WO | 2004034615 | 4/2004 |
| WO | WO2005022773 A1 | 3/2005 |
| WO | WO2005094112 | 10/2005 |
| WO | 2006038786 | 4/2006 |
| WO | WO2006104347 A1 | 10/2006 |

OTHER PUBLICATIONS

Drawings of U.S. Appl. No. 60/852,955 to Lixin Cheng filed Oct. 19, 2006, pp. 1-6.*

International Search Report—PCT/US08/061222, International Search Authority—European Patent Office-Aug. 19, 2008.

Written Opinion—PCT/US08/081222, International Search Authority—European Patent Office—Aug. 19, 2008.

Taiwan Search Report-TW097105662—TIPO-Jul. 4, 2011 (061490TW).

3GPP—3rd Generation Partnership Project; Technical Specification Group Radio Access Network; FOG Enhanced Uplink; Overall description; Stage 2 (Release 6), 3rd Generation Partnership Project; TeCHNICAL Specification, vols. 3GPP TS 25.309. No. VS.2.0 Mar. 1, 2005, pp. 1-30.

CDMA 2000 1xEV-EO Standard, 3rd Generation Partnership Project 2 '3GPP2' "cdma2000 High Rate Broadcast-Multicast Packet Data Air Interface Specification," 3GPP2 C.S0024 Version 3.0, Dec. 5, 2001.

Overload Indicator Command Triggering 3GPP TSG-RAN WG2 #45 BIS, XX, XX, R2- 050172, Jan. 10, 2005 pp. 1-4, XP002370693.

Translation of Office Action in Korean application 10-2009-7024498 corresponding to U.S. Appl. No. 12/107,013, citing KR1020060041674 and KR1020040045102 dated Feb. 11, 2011 (061486KR).

Nean Lund, "Methods of measuring adjacent-band radiation from radio transmitters", Proceedings of the I.R.E., Sep. 18, 2006, pp. 653-656, Retrieved from the Internet: URL:http://www.ieeexplore.ieee.org, [retrieved on Mar. 8, 2011].

* cited by examiner

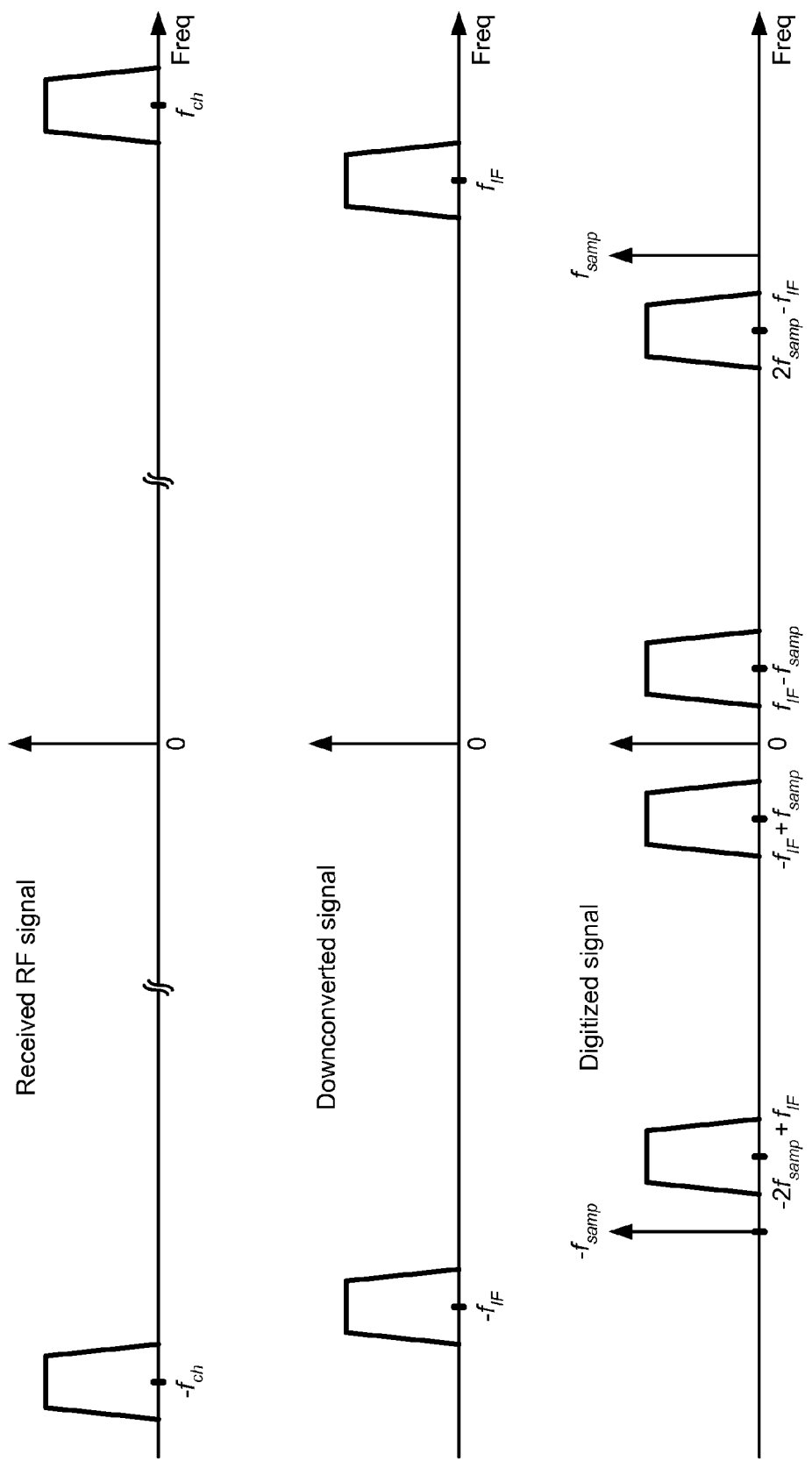

ESTIMATION OF THERMAL NOISE AND RISE-OVER-THERMAL IN A WIRELESS COMMUNICATION SYSTEM

CLAIM OF PRIORITY UNDER 35 U.S.C. §119

The present Application for patent claims priority to Provisional U.S. Application Ser. No. 60/913,778, entitled "A Method to Estimate Rise over Thermal (ROT) in W-CDMA," filed Apr. 24, 2007, assigned to the assignee hereof, and expressly incorporated herein by reference.

BACKGROUND

I. Field

The present disclosure relates generally to communication, and more specifically to techniques for estimating thermal noise and rise-over-thermal (RoT) in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a CDMA communication system, multiple user equipments (UEs) may currently transmit on the uplink to a Node B. The transmission from each UE acts as interference to the transmissions from other UEs at the Node B. The received signal quality of a given UE is dependent on various factors such as the amount of transmit power used by the UE, the path loss from the UE to the Node B, the amount of interference observed by the UE at the Node B, etc. The total interference at the Node B increases when the UEs increase their transmit power and/or when more UEs are added. At some point, the UEs cannot further increase their transmit power and no more UEs can be added. The capacity of the system is thus interference-limited on the uplink.

RoT is a ratio of total noise and interference to thermal noise at a cell. RoT is a fundamental measure of loading on the uplink. It may be desirable to accurately estimate RoT in order to maintain the uplink loading below a target level to avoid system instability. An accurate estimate of thermal noise is needed for an accurate estimate of RoT.

SUMMARY

Techniques for estimating thermal noise and RoT in a communication system are described herein. In an aspect, the thermal noise may be estimated in a sideband between adjacent frequency channels. Thermal noise density may be assumed to be constant across frequency. The thermal noise density in the sideband may be measured and used as an estimate of the thermal noise density in a signal band.

In one design, received power in the sideband may be measured, e.g., by transforming blocks of samples to frequency domain to obtain blocks of transform coefficients and then computing the total power of transform coefficients within the sideband to obtain the received power in the sideband. Thermal noise may be estimated based on (e.g., by filtering) the measured received power in the sideband. Received power in the signal band may also be measured, e.g., by filtering each block of transformed coefficients with a matched filter and then computing the total power of filtered coefficients within the signal band to obtain the received power in the signal band. The total received power may be estimated based on (e.g., by filtering) the measured received power in the signal band. RoT may then be estimated based on the estimated thermal noise and the estimated total received power.

In one design, an available load for a cell may be estimated based on the estimated RoT. Scheduling and/or admission control may be performed based on the available load. In one design, a user to admit or schedule may be selected, the load of the selected user may be determined, and the available load may be updated based on the load of the selected user.

Various aspects and features of the disclosure are described in further detail below.

BRIEF DESCRIPTION OF THE DRAWINGS

FIG. 5A shows downconversion and sampling of a radio frequency (RF) signal.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

For clarity, certain aspects of the techniques are described below for UMTS, and UMTS terminology is used in much of the description below. In the following description, the term "CDMA" generically refers to any variant of CDMA (e.g., WCDMA, cdma2000, etc.), and the term "WCDMA" refers to the specific variant of CDMA defined by 3GPP.

Figure 1:
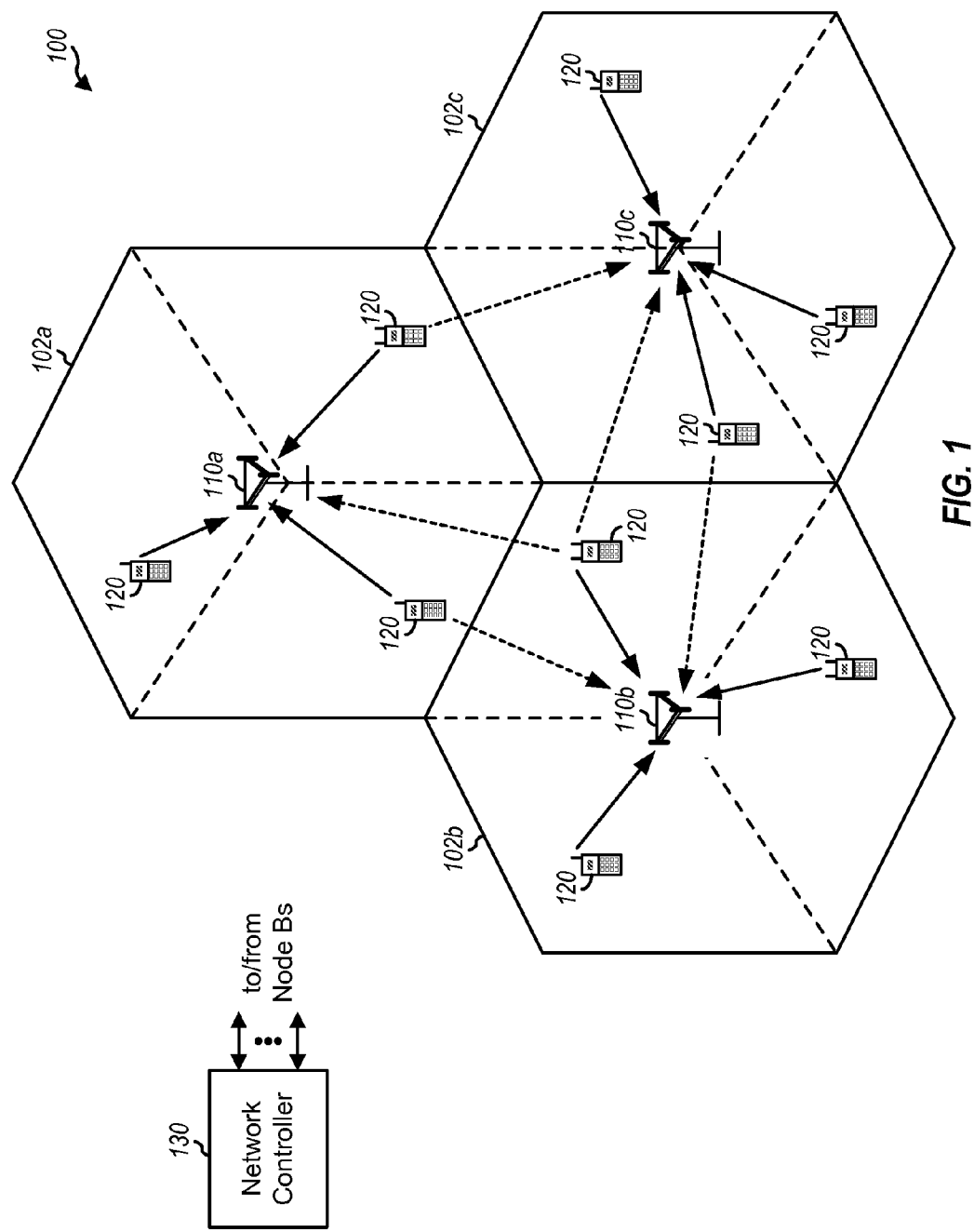
FIG. 1 shows a wireless communication system.

FIG. 1 shows a wireless communication system 100, which may be a Universal Terrestrial Radio Access Network (UT- RAN) in UMTS. System 100 includes multiple Node Bs 110. A Node B is a fixed station that communicates with the UEs and may also be referred to as an evolved Node B (eNB), a base station, an access point, etc. Each Node B 110 provides communication coverage for a particular geographic area 102 and supports communication for the UEs located within the coverage area. The coverage area of a Node B may be partitioned into multiple (e.g., three) smaller areas, and each smaller area may be served by a respective Node B subsystem. The term "cell" can refer to the smallest coverage area of a Node B and/or a Node B subsystem serving this coverage area, depending on the context in which the term is used. In some systems, the term "sector" can refer to the smallest coverage area of a base station and/or a base station subsystem serving this coverage area. For clarity, the concept of cell in UMTS is used in the description below.

A network controller 130 may couple to Node Bs 110 and provide coordination and control for these Node Bs. Network controller 130 may be a single network entity or a collection of network entities. For example, network controller 130 may be a Radio Network Controller (RNC) in UMTS.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with a Node B via transmissions on the downlink and uplink. The downlink (or forward link) refers to the communication link from the Node B to the UE, and the uplink (or reverse link) refers to the communication link from the UE to the Node B. For clarity, FIG. 1 shows only uplink transmissions from UEs 120 to Node Bs 110. In FIG. 1, a solid line with a single arrow indicates a transmission to a serving cell, and a dashed line with a single arrow indicates a transmission to a non-serving cell. The terms "UE" and "user" are used interchangeably herein.

As shown in FIG. 1, each cell may receive transmissions from users served by that cell as well as transmissions from users not served by the cell. The total interference observed at each cell is composed of (1) intra-cell interference from users within that cell and (2) inter-cell interference from users in other cells. The inter-cell interference and intra-cell interference may have a large impact on performance and may be taken into account in scheduling users, as described below.

On the uplink in system 100, the transmission from each user acts as interference to the transmissions from other users at a serving cell. Hence, whenever a new user is scheduled on the uplink, the transmission from this user increases the interference to other users. The amount of interference caused by the new user is dependent on various factors such as the amount of transmit power used by the user, the path loss from the user to the cell, etc. As users are added, other active users may need to increase their transmit power, and the total interference at the cell may increase. At some point, no more users may be added since the system is interference-limited on the uplink.

Figure 2:
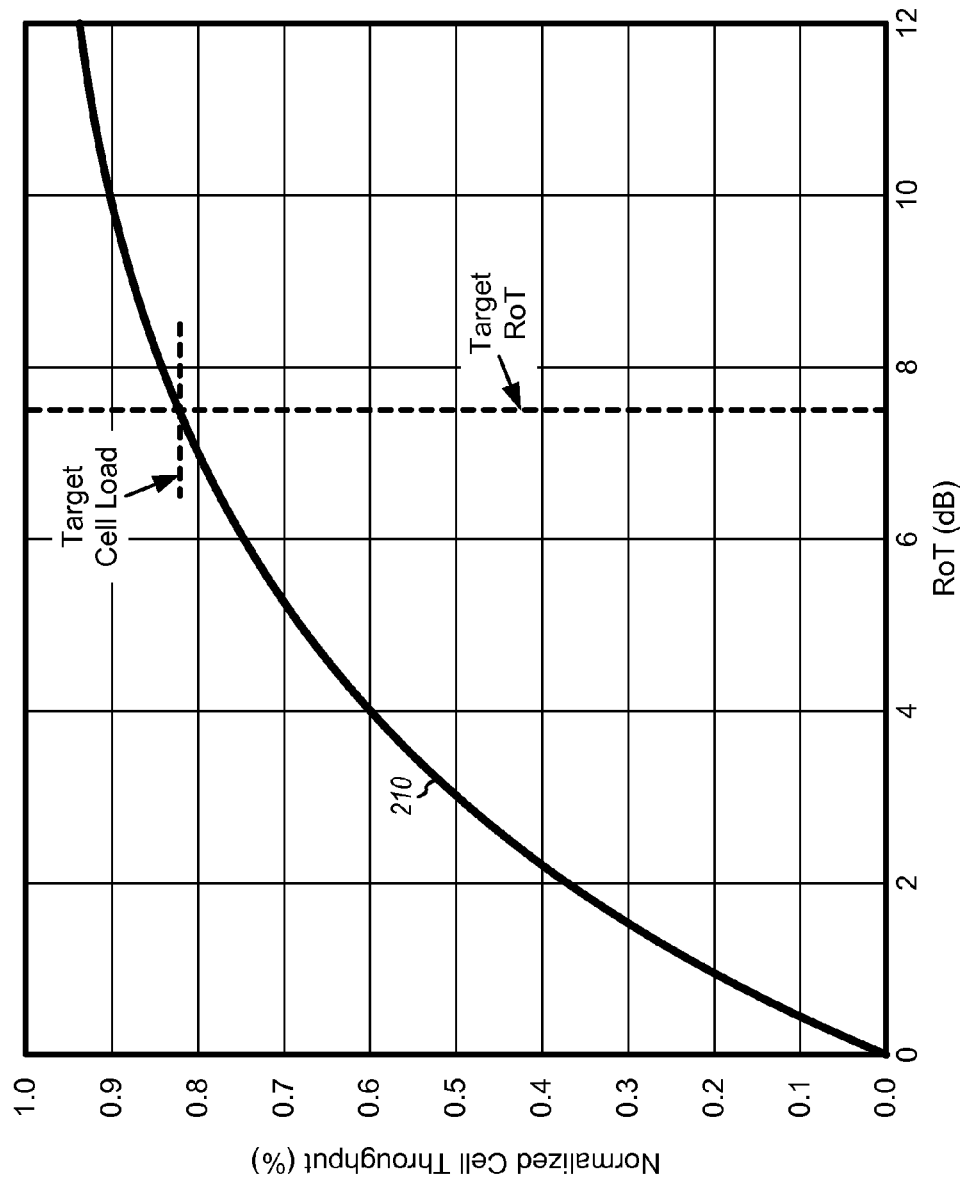
FIG. 2 shows a plot of normalized cell throughput versus RoT on the uplink.

FIG. 2 shows a plot 210 of normalized cell throughput versus RoT for the uplink. Normalized cell throughput is the total throughput of all users on the uplink divided by the maximum total throughput. As shown in FIG. 2, cell throughput increases by a larger percentage at low RoT and asymptotically reaches a maximum value at high RoT.

It may be desirable to accurately estimate/measure RoT at a cell. The estimated RoT may be used to admit and/or schedule users in the cell and to ensure that the cell operates at a target RoT. The RoT of the cell may be expressed as:

$$RoT = \frac{I_0}{N_0}, \quad \text{Eq (1)}$$

where $I_0$ is the total noise and interference observed by the cell, and
$N_0$ is the thermal noise observed by the cell.

As shown in equation (1), an accurate estimate of RoT may be obtained with an accurate estimate of $I_0$ as well as an accurate estimate of $N_0$. The total noise and interference $I_0$ may be estimated based on the total received power at the cell, as described below. The thermal noise $N_0$ may be estimated during a silence interval in which no users transmit on the uplink. $N_0$ may then be estimated based on the total received power at the cell during the silence interval. However, such a silence interval may not be available in some systems. For example, may be difficult to obtain a silence interval in an asynchronous system in which the timing of each cell may be asynchronous with the timing of other cells.

In an aspect, the thermal noise $N_0$ may be estimated in a sideband between adjacent CDMA channels. A sideband may also be referred to as a guard band, a stopband, etc. The thermal noise density may be assumed to be constant across a signal band and the sideband. The thermal noise density in the sideband may then be measured and used as an estimate of the thermal noise density in the signal band.

Figure 3:
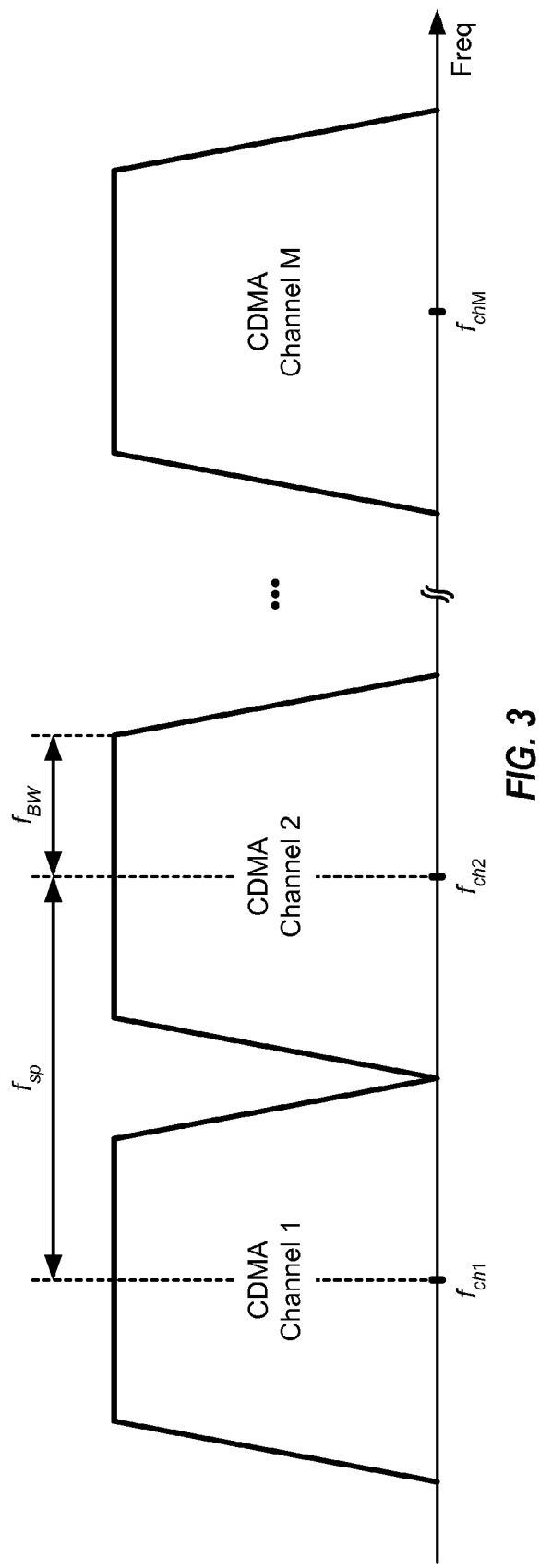
FIG. 3 shows multiple CDMA channels in a frequency band.

FIG. 3 shows an example of M CDMA signals on M CDMA channels in a frequency band, where M may be any integer value. A CDMA channel may also be referred to as a UMTS channel, a frequency channel, a carrier, etc. The M CDMA signals may be centered at frequencies of $f_{ch1}$ to $f_{chM}$, which may be selected by a network operator. Each CDMA signal has a one-sided bandwidth of $f_{BW}$, which may be determined based on the chip rate used by the system. Adjacent CDMA channels may be spaced apart by $f_{sp}$, where in general $f_{sp} > 2f_{BW}$. For WCDMA, the chip rate is 3.84 megachips/second (Mcps), and a WCDMA signal has a two-sided bandwidth of $2f_{BW} = 3.84$ MHz. The spacing between adjacent WCDMA channels may be 5.0 MHz nominally but may be as close as 4.8 MHz.

A WCDMA signal is required to have output power conforming to a spectrum emission mask. The spectrum emission mask requires the WCDMA signal level to be down by at least 35 decibels (dB) at 2.5 MHz offset from the carrier frequency, and by more than 35 dB at greater frequency offset. The emission requirements for WCDMA are given in 3GPP TS 25.101, entitled "User Equipment (UE) radio transmission and reception (FDD)," which is publicly available.

Figure 4:
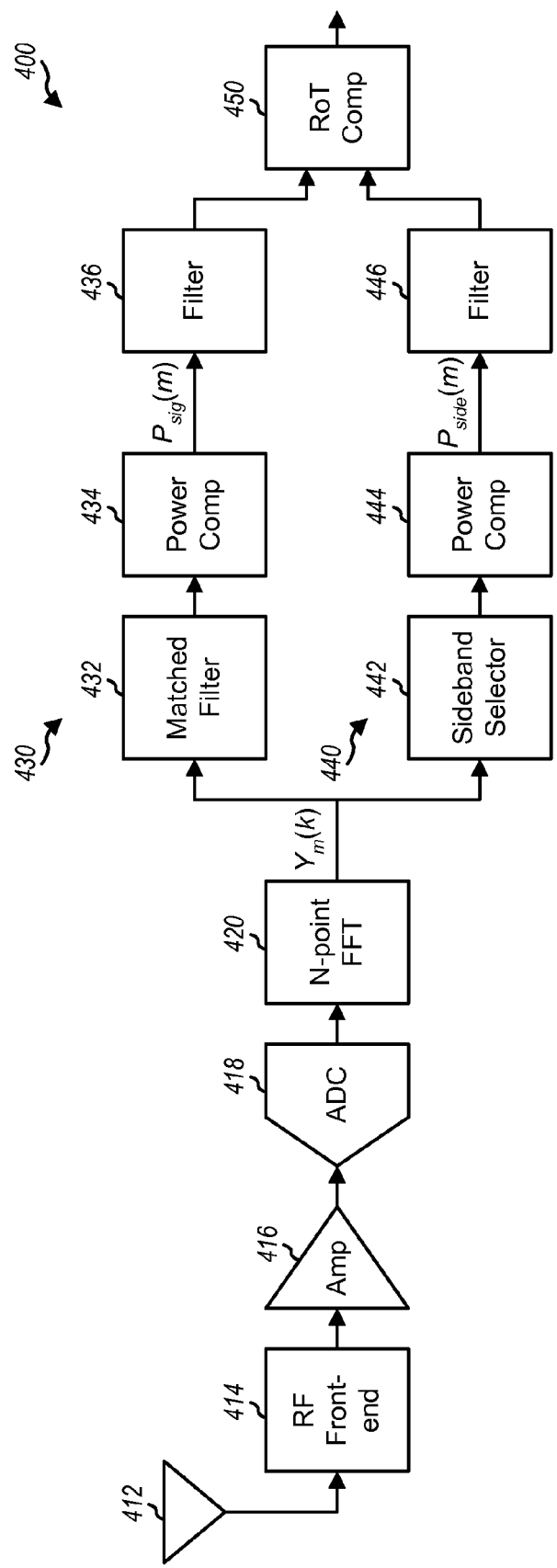
FIG. 4 shows a receiver capable of estimating thermal noise and RoT.

FIG. 4 shows a block diagram of a design of a receiver 400 capable of estimating thermal noise and RoT. Receiver 400 may be part of a Node B or some other entity. Within receiver 400, an antenna 412 receives uplink signals from UEs and provides a received RF signal to an RF front-end unit 414. Within RF front-end unit 414, the received RF signal may be amplified by a low noise amplifier (LNA), filtered by a bandpass filter, and downconverted by a mixer. In one design, RF front-end unit 414 provides a downconverted signal comprising a desired CDMA signal at or near DC. In another design, RF front-end unit 414 provides a downconverted signal comprising the desired CDMA signal at an intermediate frequency (IF). In general, the desired CDMA signal may be downconverted to any frequency suitable for subsequent processing.

An amplifier (Amp) 416 amplifies the downconverted signal from RF front-end unit 414 with a gain of G and provides an amplified downconverted signal. The gain G may be selected such that the thermal noise floor of the amplified signal is higher than the quantization noise of a subsequent ADC 418.

ADC 418 digitizes the amplified downconverted signal and provides samples at a sampling rate of $f_{samp}$, where in general $f_{samp} > 2f_{BW}$. ADC 418 may oversample the desired CDMA signal, which may be at or near DC. ADC 418 may also undersample the desired CDMA signal, which may be at IF and aliased to a low frequency due to undersampling. In any case, the samples include the desired CDMA signal within a frequency range of 0 to $f_{samp}$.

FIG. 5A shows a design of downconversion and IF sampling by receiver 400. The received RF signal provided to RF front-end unit 414 may include a desired CDMA signal centered at a frequency of $f_{ch}$. In this design, RF front-end unit 414 may downconvert the received RF signal from RF to IF and provide the downconverted signal comprising the desired CDMA signal centered at a frequency of $f_{IF}$. ADC 418 may digitize the downconverted signal at the sampling rate of $f_{samp}$. The desired CDMA signal may be undersampled, which may then result in images of the desired CDMA signal appearing at frequencies of $\pm(f_{IF}-f_{samp})$ and $\pm(2f_{samp}-f_{IF})$. For example, the IF frequency may be $f_{IF}=70$ MHz, the sampling rate may be $f_{samp}=16$ chip rate or 61.44 megasamples/second (Msps), and the CDMA signal images may be at $\pm 8.56$ MHz and $\pm 52.88$ MHz.

Figure 5B:
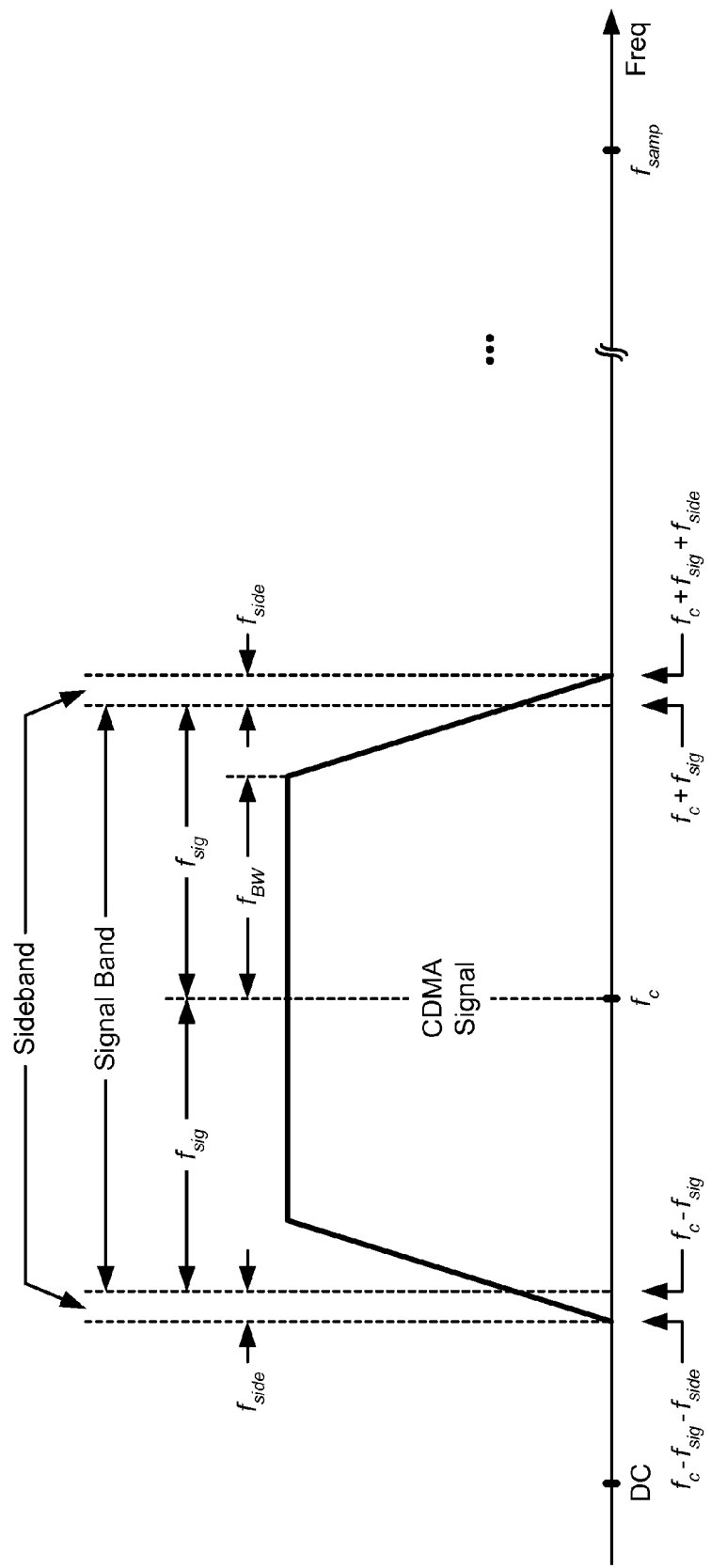
FIG. 5B shows a digitized signal from an analog-to-digital converter (ADC).

FIG. 5B shows a diagram of a digitized signal from ADC 418, in accordance with one design. In this design, the digitized signal includes the desired CDMA signal centered at a frequency of $f_c$. The center frequency $f_c$ is dependent on the downconversion by RF front-end unit 414 and the sampling rate of ADC 418. The signal band of the CDMA signal has a width of $2f_{sig}$ and is from frequency $f_c-f_{sig}$ to frequency $f_c+f_{sig}$. The one-sided signal band $f_{sig}$ may be less than, equal to, or greater than the one-sided bandwidth $f_{BW}$ of the CDMA signal and may be selected based on signal characteristics. In one design, the signal band $2f_{sig}$ may be selected as the bandwidth that captures a predetermined percentage (e.g., 99%) of the total received power after matched filtering.

When the center frequency is not at DC, as shown in FIGS. 5A and 5B, the sideband may include a right sideband part (or right shoulder) and a left sideband part (or left shoulder). The right sideband part has a width of side and is from frequency $f_c+f_{sig}$ to frequency $f_c+f_{sig}+f_{side}$. The left sideband part has a width of $f_{side}$ and is from frequency $f_c-f_{sig}$ to frequency $f_c-f_{sig}-f_{side}$. The width of each sideband part may be selected based on the spacing between CDMA channels and/or other factors.

In the design shown in FIG. 5B, the CDMA signal is center at a positive frequency. In another design, the CDMA signal is centered at DC, or $f_c=0$ Hz. In this design, the signal band may be from DC to $f_{sig}$, and the sideband may be from $f_{sig}$ to $f_{sig}+f_{side}$. The signal band and the sideband may also cover other ranges of frequency.

Referring back to FIG. 4, ADC 418 may be selected such that its quantization noise is below the thermal noise floor and its dynamic range is sufficient for the largest expected received signal. In one design, ADC 418 has a target variance of 32 when the receiver input is removed, which correspond to five bits being used for quantization. In one design, 13 dB or more of dynamic range may be handled with four or more additional bits. ADC 418 may thus have 9 or more bits. Other bit width may also be used for ADC 418.

A fast Fourier transform (FFT) unit 420 partitions the samples from ADC 418 into blocks. In one design, each block includes N consecutive samples, and the blocks are non-overlapping. In another design, the blocks are overlapping, and each block includes some samples from a prior block as well as new samples. In any case, N may be a power of two and may be equal to 8192 or some other value. FFT unit 420 performs an N-point FFT on each block of N samples and provides a corresponding block of N transform coefficients to a first processing path 430 and a second processing path 440. Path 430 computes the total received power in the signal band. Path 440 computes the thermal noise in the sideband.

Within first processing path 430, a matched filter 432 filters each block of N transform coefficients and provides a corresponding block of N filtered coefficients. Matched filter 432 may be the same matched filter used in a data path to process uplink signals from the users. A power computation unit 434 computes the total power in the signal band for each block, as follows:

$$P_{sig}(m) = \sum_{k=f_c-f_{sig}}^{f_c+f_{sig}} |Y_m(k) \cdot H(k)|^2, \quad \text{Eq (2)}$$

where $Y_m(k)$ is a transform coefficient for frequency bin k in block m, $H(k)$ is a gain of matched filter 432 for frequency bin k, and $P_{sig}(m)$ is the signal band power for block m.

In equation (2), $Y_m(k) \cdot H(k)$ is a filtered coefficient for frequency bin k from matched filter 432. Equation (2) sums the square magnitude of the filtered coefficients within the signal band from $f_c-f_{sig}$ to $f_c+f_{sig}$ to obtain the signal band power for the block.

In one design, a filter 436 filters the signal band power with an infinite impulse response (IIR) filter, as follows:

$$\tilde{P}_{sig}(m) = \alpha_{sig} \cdot P_{sig}(m) + (1-\alpha_{sig}) \cdot \tilde{P}_{sig}(m-1), \quad \text{Eq (3)}$$

where $\alpha_{sig}$ is an IIR coefficient that determines the amount of averaging, and $\tilde{P}_{sig}(m)$ is the filtered signal band power for block m.

The IIR coefficient $\alpha_{sig}$ may be selected based on the desired amount of averaging for the signal band power. In one design, each block covers 0.2 slots or 0.133 milliseconds (ms) in WCDMA, and the IIR coefficient may be selected as $\alpha_{sig}=\frac{1}{128}$ to obtain a time constant of approximately 25 slots. Other values may also be used for the IIR coefficient. The filtering may also be performed with a finite impulse response (FIR) filter, a moving average filter, etc. In any case, filter 436 provides the filtered signal band power for each block as the total received power to an RoT computation unit 450.

Within second processing path 440, a sideband selector 442 receives the N transform coefficients in each block, provides the transform coefficients within the sideband, and discards the remaining transform coefficients. A matched filter is not included in second processing path 440 so that the thermal noise outside of the signal band is not attenuated.

In one design, a power computation unit 444 computes the total power in the sideband for each block, as follows:

$$P_{side}(m) = \sum_{k=f_c-f_{sig}-f_{side}}^{f_c-f_{sig}-1} |Y_m(k)|^2 + \sum_{k=f_c+f_{sig}+1}^{f_c+f_{sig}+f_{side}} |Y_m(k)|^2, \quad \text{Eq (4)}$$

where $P_{side}(m)$ is the sideband power for block m.

In equation (4), the left summation sums the square magnitude of the transform coefficients within the left sideband part from $f_c-f_{sig}-f_{side}$ to $f_c-f_{sig}+1$. The right summation sums the square magnitude of the transform coefficients within the right sideband part from $f_c+f_{sig}+1$ to $f_c+f_{sig}+f_{side}$. The sideband power is equal to the sum of the total powers for the left and right sideband parts.

In one design, a filter 446 filters the sideband power with an IIR filter, as follows:

$$\tilde{P}_{side}(m)=\alpha_{side}\cdot P_{side}(m)+(1-\alpha_{side})\cdot \tilde{P}_{side}(m-1), \quad \text{Eq (5)}$$

where $\alpha_{side}$ is an IIR coefficient that determines the amount of averaging, and $\tilde{P}_{side}(m)$ is the filtered sideband power for block m.

The IIR coefficient $\alpha_{side}$ may be selected based on the desired amount of averaging for the sideband power. Since the thermal noise power changes much slower than the signal power, $\alpha_{side}$ may be much smaller than $\alpha_{sig}$. In one design, $\alpha_{side}$ may be selected as follows:

$$\alpha_{side} \leq \alpha_{sig} \cdot \frac{f_{side}}{f_{sig}}. \quad \text{Eq (6)}$$

If $f_{side} \ll f_{sig}$, then $\alpha_{side}$ may be a very small value, and the IIR filter may be implemented with arithmetic of sufficient precision.

In another design, filter 446 computes a moving average of the sideband power over a window of length L, as follows:

$$\tilde{P}_{side}(m) = \frac{1}{L} \cdot \sum_{i=0}^{L-1} P_{side}(m-i). \quad \text{Eq (7)}$$

The window length L may be selected as follows:

$$L \gg \frac{f_{sig}}{\alpha_{sig}\cdot f_{side}}. \quad \text{Eq (8)}$$

Filter 446 may also filter the sideband power with a FIR filter or in some other manner. In any case, filter 446 provides the filtered sideband power for each block as the thermal noise to RoT computation unit 450.

Unit 450 receives the total received power $\tilde{P}_{sig}(m)$ for each block from filter 436 and the thermal noise $\tilde{P}_{side}(m)$ for each block from filter 446. In one design, unit 450 computes the RoT as follows:

$$RoT = K_{cal} \cdot \frac{\tilde{P}_{sig}(m)/f_{sig,eff}}{\tilde{P}_{side}(m)/2f_{side}}, \quad \text{Eq (9)}$$

where $K_{cal}$ is a calibration factor and $f_{sig,eff}$ is an effective signal bandwidth of matched filter 432.

The effective signal bandwidth may be expressed as:

$$f_{sig,eff} = \sum_{k=-f_{sig}}^{f_{sig}} |H(k)|^2, \quad \text{Eq (10)}$$

where H(k) is assumed to be normalized so that the passband has a magnitude of 1.0.

In equation (9), the total received power is divided by $f_{sig,eff}$ to obtain the received power density, and the thermal noise power is divided by $2f_{side}$ to obtain the thermal noise density. Equivalently, the thermal noise power $\tilde{P}_{side}(m)$ from the sideband may be scaled by the ratio $f_{sig,eff}/2f_{side}$ to obtain the thermal noise power for the signal band. In any case, the scaling by $f_{sig,eff}$ and $2f_{side}$ ensure that RoT is computed using quantities of the same unit in both the numerator and denominator. The calibration factor $K_{cal}$ may be selected such that the RoT is normalized to 0 dB during calibration when no received signal is applied to the antenna input.

In one design, the sampling rate is 16 times chip rate (or chipx16) and given as $f_{samp}=16\times 3.84=61.44$ MHz. 8192-point FFTs are performed on the samples from ADC 418, and the frequency bin spacing is 7.5 KHz. The signal band is $f_{sig}=2.4$ MHz, which corresponds to 320 frequency bins. The sideband is between 2.4 and 2.5 MHz, or $f_{side}=0.1$ MHz, which corresponds to 13 frequency bins. The signal band and the sideband may also be defined with other widths, which may be smaller or larger than the values given above. The signal band and the sideband may also be defined differently if the desired CDMA signal is centered at DC instead of $f_c$.

The estimated RoT from equation (9) may be used for scheduling, admission control, and/or other purposes. The total load of a cell may be expressed as:

$$L_{total\_cell}=L_{in-cell}+L_{ns,AS}+L_{out}, \quad \text{Eq (11)}$$

where $L_{in-cell}$ is the load of users served by the cell, $L_{ns,As}$ is the load of users not served by the cell but have the cell in their active sets, $L_{out}$ is the load of users in other cells and not having the cell in their active sets, and $L_{total\_cell}$ is the total load of the cell. $L_{out}$ corresponds to interference from users in other cells.

The total cell load may be expressed in terms of the estimated RoT, as follows:

$$L_{total\_cell} = \frac{I_0 - N_0}{I_0} = 1 - \frac{1}{RoT}. \quad \text{Eq (12)}$$

The cell may estimate $L_{in-cell}$ and $L_{ns,As}$ based on uplink signals received from users. The cell may compute $L_{total\_cell}$ based on the estimated RoT and may then compute $L_{out}$ based on $L_{in-cell}$, $L_{ns,AS}$ and $L_{total\_cell}$. The cell may filter $L_{in-cell}$, $L_{ns,AS}$ and $L_{out}$ to obtain corresponding filtered loads $\tilde{L}_{in-cell}$, $\tilde{L}_{ns,AS}$ and $\tilde{L}_{out}$, respectively.

The cell may compute a target total load based on a target RoT, as follows:

$$L_{total\_target} = 1 - \frac{1}{RoT\_target}, \quad \text{Eq (13)}$$

where $L_{total,target}$ is the target total load for the cell, and

RoT_target is the target RoT for the cell.

The cell may compute the available load for the cell, as follows:

$$L_{avail\_cell}=L_{total\_target}-\tilde{L}_{out}-\tilde{L}_{ns,AS}, \quad \text{Eq (14)}$$

where $L_{avail\_cell}$ is the available load for the cell.

The cell may admit new users and/or schedule users based on the available load. For a given user i being admitted or scheduled, the loading due to user i may be computed as follows:

$$L_i = \frac{(E_c)_i}{I_0} = \frac{(E_c/N_t)_i}{1+(E_c/N_t)_i}, \quad \text{Eq (15)}$$

where $(E_c)_i$ is a total-energy-per-chip for user i,
$(E_c/N_t)_i$ is a total-energy-per-chip-to-total-noise ratio for user i, and
$L_i$ is the load of user i.

The total-energy-per-chip-to-total-noise ratio for user i may be expressed as:

$$(E_c/N_t)_i = (E_{cp}/N_t)_i \cdot (1+O2P_i+T2P_i), \quad \text{Eq (16)}$$

where $E_{cp}$ is an energy-per-chip for pilot,
$E_c$ is a total-energy-per-chip for data, overhead, and pilot,
$N_t$ is total noise and interference observed by the cell,
$(E_{cp}/N_t)_i$ is a pilot-energy-per-chip-to-total-noise ratio for user i,
$O2P_i$ is an overhead-to-pilot ratio for user i, and
$T2P_i$ is a traffic-to-pilot ratio for user i.

$(E_{cp}/N_t)_i$ may be estimated based on pilot transmitted by user i on the uplink. User i may transmit overhead or signaling at a power level determined by $O2P_i$ and may transmit data at a power level determined by $T2P_i$. $O2P_i$ is the ratio of signaling power level to pilot power level and may be a fixed value. $T2P_i$ is the ratio of data power level to pilot power level and may be dependent on the data rate assigned to user i. The pilot power level may be adjusted via power control to achieve a desired level of performance, e.g., a target block error rate (BLER). The ratios $O2P_i$ and $T2P_i$ may be known or may be determined for user i. $(E_c/N_t)_i$ for user i may be computed based on the estimated $(E_{cp}/N_t)$, and the known $O2P_i$ and $T2P_i$.

The available load for the cell may be updated to reflect the admission or scheduling of user i, as follows:

$$L_{avail\_cell} = L_{avail\_cell} - L_i. \quad \text{Eq (17)}$$

Additional users may be admitted and/or scheduled in similar manner until all of the available load for the cell is used. The scheduling of users based on the available load is described in detail in commonly assigned U.S. patent application Ser. No. 12/031,245, entitled "SCHEDULING BASED ON RISE-OVER-THERMAL IN A WIRELESS COMMUNICATION SYSTEM," filed Feb. 14, 2008. Scheduling and admission control using the estimated RoT may also be performed in other manners.

The techniques described herein may provide certain advantages. An accurate estimate of thermal noise may allow for an accurate estimate of RoT, which may allow for derivation of a more accurate estimate of the outside load $L_{out}$, which in turn may allow for derivation of a more accurate estimate of the available load $L_{avail\_cell}$ for the cell. The more accurate $L_{avail\_cell}$ may allow the cell to operate closer to the target total load $L_{total,target}$, which may improve capacity. The more accurate $L_{avail\_cell}$ may also allow the cell to operate at a higher target load while still ensuring stability.

For clarity, certain aspects of the techniques have been described for estimating thermal noise and computing RoT in a CDMA system. In general, the techniques may be used to estimate thermal noise in any wireless communication system, wireline communication system, etc. The estimated thermal noise may be used to compute various metrics. For example, the estimated thermal noise may be used to compute interference-over-thermal (IoT) in an OFDMA system or an SC-FDMA system. An OFDMA or SC-FDMA system may include K total subcarriers, a subset of the K total usable subcarriers, and the remaining subcarriers may serve as guard subcarriers and are not used. The thermal noise may be estimated based on (i) received power in the sideband between carriers, as described above, (ii) received power for the guard subcarriers, or (iii) received power for a frequency range not used for communication.

Figure 6:
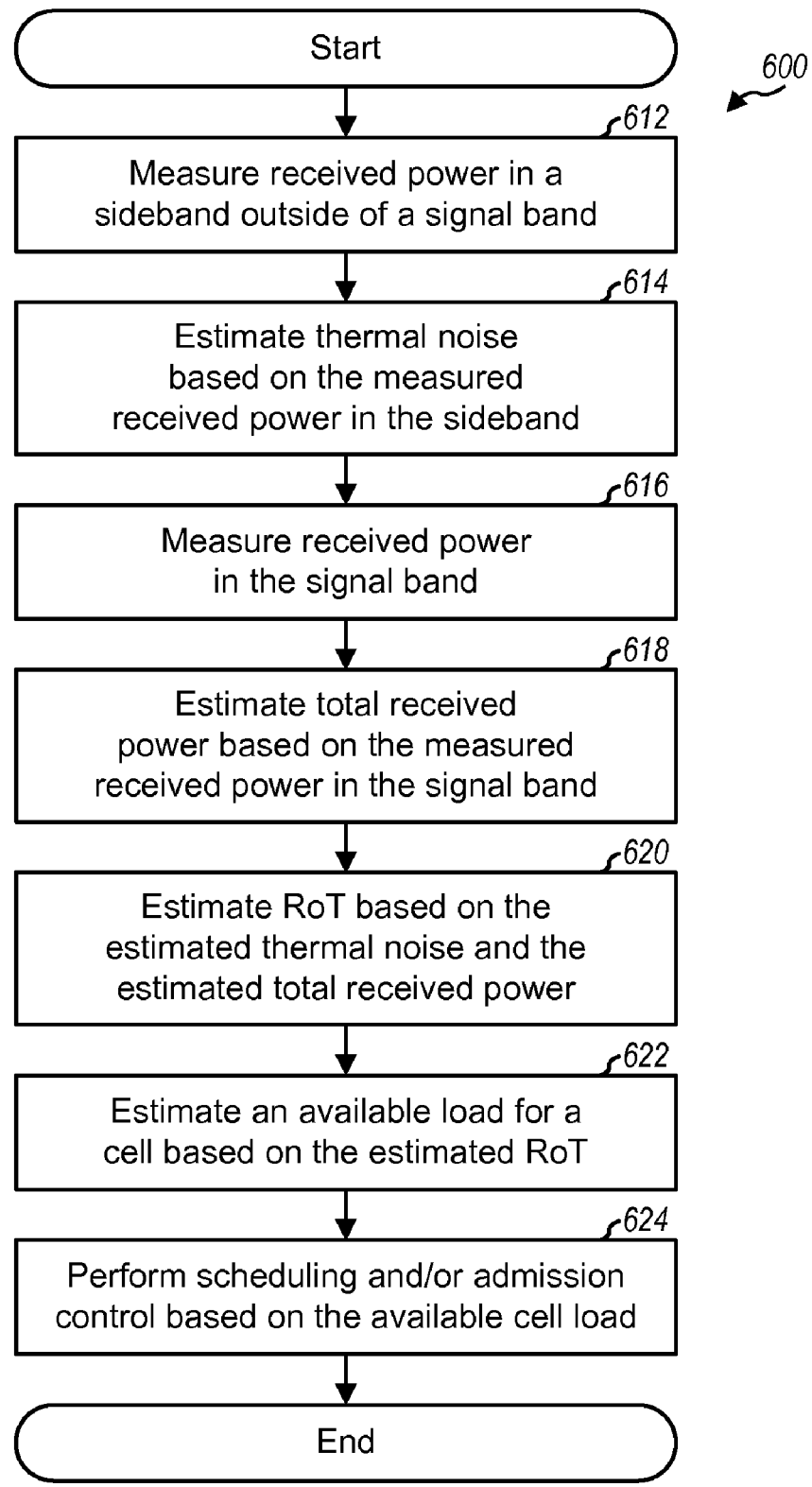
FIG. 6 shows a process for estimating thermal noise and RoT.

FIG. 6 shows a design of a process 600 for estimating thermal noise and RoT in a communication system. Process 600 may be performed by a Node B or some other entity. Received power in a sideband outside of a signal band may be measured (block 612). The location of the sideband may be selected based on the frequency spacing between adjacent CDMA channels and/or other factors. In one design of block 612, samples from an ADC may be partitioned into blocks of N samples, and each block of N samples may be transformed (e.g., with an N-point FFT) to obtain a corresponding block of N transform coefficients. The total power of transform coefficients within the sideband may be computed to obtain the received power in the sideband. The received power in the sideband may also be measured in other manners.

Thermal noise may be estimated based on the measured received power in the sideband (block 614). In one design of block 614, the measured received power in the sideband may be filtered (e.g., with an IIR filter or a moving average filter) to obtain the estimated thermal noise.

Received power in the signal band may also be measured (block 616). In one design of block 616, each block of N transform coefficients may be filtered with a matched filter to obtain a corresponding block of N filtered coefficients. The total power of filtered coefficients within the signal band may be computed to obtain the received power in the signal band. The received power in the signal band may also be measured in other manners.

The total received power may be estimated based on the measured received power in the signal band (block 618). In one design of block 618, the measured received power in the signal band may be filtered (e.g., with an IIR filter) to obtain the estimated total received power.

RoT may be estimated based on the estimated thermal noise and the estimated total received power (block 620). In one design, RoT may be computed based on the estimated thermal noise, the estimated total received power, the sideband, an effective signal band for the total received power, and a calibration factor, e.g., as shown in equation (9). The calibration factor may be selected to provide a predetermined RoT value when no signal is applied.

An available load for a cell may be estimated based on the estimated RoT, e.g., as shown in equation (12) (block 622). Scheduling and/or admission control may be performed based on the available cell load (block 624). In one design of block 624, a user to admit or schedule may be selected, and the load of the selected user may be determined, e.g., as shown in equation (15). The available cell load may be then updated based on the load of the selected user, e.g., as shown in equation (17). The available cell load may also be used for scheduling and/or admission control in other manners. The estimated thermal noise, the estimated RoT, and/or other information may also be provided by the Node B to a network controller.

Figure 7:
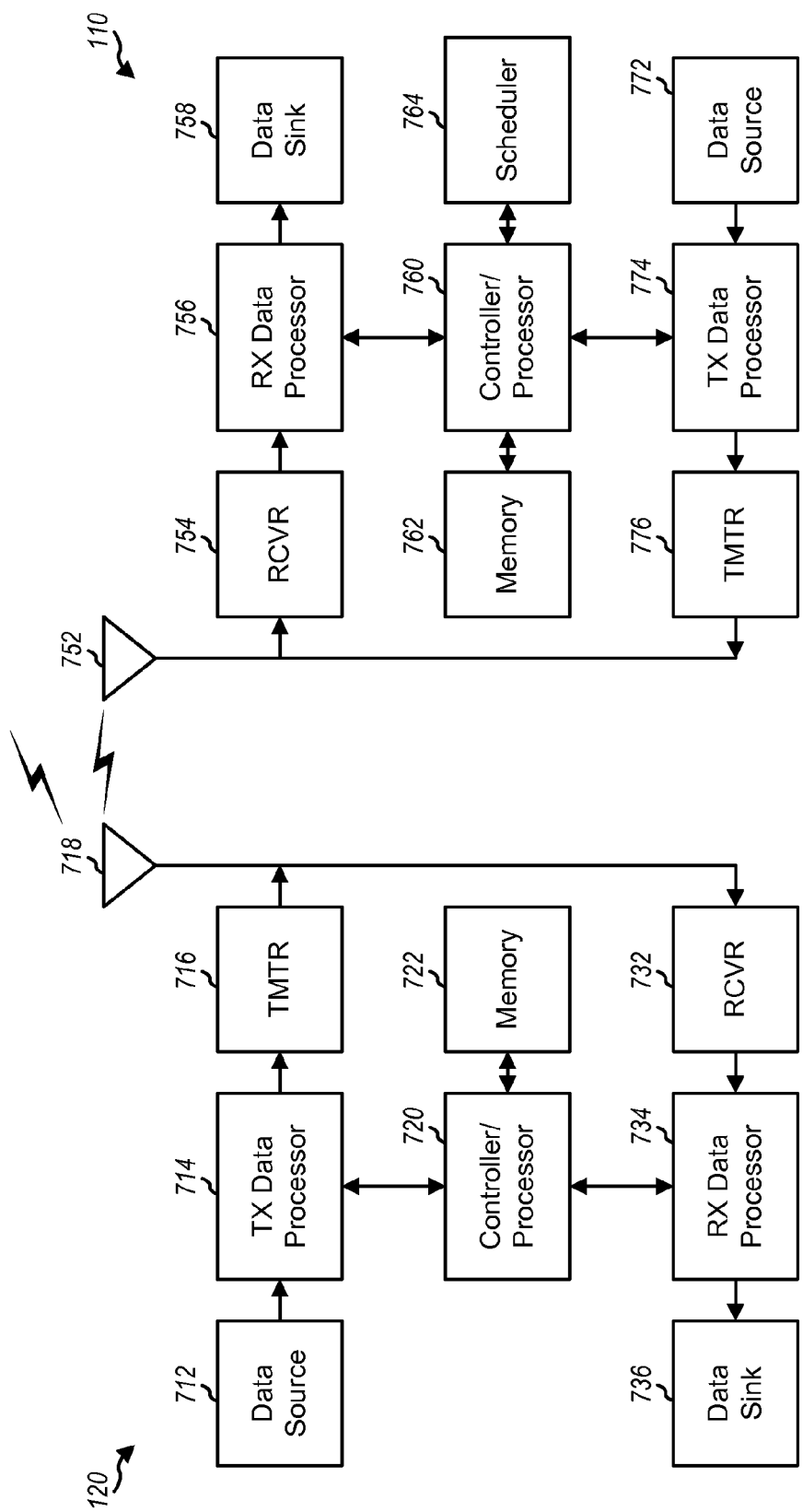
FIG. 7 shows a block diagram of a Node B and a UE.

FIG. 7 shows a block diagram of a design of a Node B 110 and a UE 120, which are one of the Node Bs and one of the UEs in system 100 in FIG. 1. At UE 120, a transmit (TX) data processor 714 receives traffic data from a data source 712 and control information from a controller/processor 720. TX data processor 714 processes (e.g., encodes and symbol maps) the data and control information, performs modulation (e.g., for CDMA), and provides output chips. A transmitter (TMTR) 716 conditions (e.g., converts to analog, filters, amplifies, and upconverts) the output chips and generates an uplink signal, which is transmitted via an antenna 718.

At Node B 110, an antenna 752 receives the uplink signals from UE 120 and other UEs and provides a received RF signal to a receiver (RCVR) 754. Receiver 754 conditions and digitizes the received RF signal and provides samples. Receiver 754 may include RF front-end unit 414, amplifier 416, and ADC 418 in FIG. 4. A received (RX) data processor 756 performs demodulation on the samples (e.g., for CDMA) and demodulates and decodes the resultant symbols to obtain decoded data and control information. Processor 756 provides the decoded data to a data sink 758 and the decoded control information to a controller/processor 760. Processor 756 and/or 760 may include units 420 to 450 in FIG. 4.

On the downlink, a TX data processor 774 at Node B 110 receives traffic data from a data source 772 for UEs scheduled for transmission on the downlink and control information from controller/processor 760. The data and control information are processed (e.g., encoded, symbol mapped, and modulated) by TX data processor 774 and further conditioned by a transmitter 776 to generate a downlink signal, which is transmitted via antenna 752. At UE 120, the downlink signal from Node B 110 is received by antenna 718, conditioned by a receiver 732, and demodulated and decoded by an RX data processor 734.

Controllers/processors 720 and 760 direct the operation at UE 120 and Node B 110, respectively. Controller/processor 760 may perform or direct process 600 in FIG. 6 and/or other processes for the techniques described herein. Memories 722 and 762 store program code and data for UE 120 and Node B 110, respectively. A scheduler 764 may schedule UEs for data transmission on the downlink and/or uplink and may assign resources to the scheduled UEs. Scheduler 764 may perform scheduling using the estimated RoT as described above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of estimating thermal noise in a communication system, comprising:
measuring received power in a signal band;
measuring received power in a sideband outside of the signal band;
estimating total received power based on the measured received power in the signal band; and estimating, by a processor, thermal noise in the signal band based on the measured received power in the sideband, wherein the sideband comprises guard subcarriers and the signal band comprises usable subcarriers among plurality of subcarriers.

2. The method of claim 1, wherein the measuring the received power in the sideband comprises
partitioning samples into blocks, each block comprising N samples, where N is greater than one,
transforming each block of N samples to obtain a corresponding block of N transform coefficients, and
computing total power of transform coefficients within the sideband to obtain the measured received power in the sideband.

3. The method of claim 1, wherein the estimating the thermal noise comprises filtering the measured received power in the sideband to obtain the estimated thermal noise.

4. The method of claim 1, wherein the estimating the thermal noise comprises filtering the measured received power in the sideband with an infinite impulse response (IIR) filter to obtain the estimated thermal noise.

5. The method of claim 1, wherein the estimating the thermal noise comprises averaging the measured received power in the sideband over a sliding window of a predetermined length to obtain the estimated thermal noise.

6. The method of claim 1, further comprising:
estimating rise-over-thermal (RoT) based on the estimated thermal noise and the estimated total received power.

7. The method of claim 6, wherein the estimating the RoT comprises computing the RoT based on the estimated thermal noise, the estimated total received power, the sideband, and an effective signal band for the total received power.

8. The method of claim 6, further comprising:
estimating an available load for a cell based on the estimated RoT; and
performing scheduling and admission control based on the available load.

9. The method of claim 6, further comprising:
reporting the estimated thermal noise or the estimate RoT, or both, to a network controller.

10. The method of claim 7, wherein the estimating the RoT comprises
computing the RoT based further on a calibration factor selected to provide a predetermined RoT value when no signal is applied.

11. The method of claim 8, wherein the performing scheduling and admission control comprises
selecting a user to admit or schedule,
determining a load of the selected user, and
updating the available load based on the load of the selected user.

12. The method of claim 1, wherein the measuring the received power in the signal band comprises
partitioning samples into blocks, each block comprising N samples, where N is greater than one,
transforming each block of N samples to obtain a corresponding block of N transform coefficients, and
computing total power of transform coefficients within the signal band to obtain the measured received power in the signal band.

13. The method of claim 12, wherein the measuring the received power in the signal band further comprises
filtering each block of N transform coefficients with a matched filter to obtain a corresponding block of N filtered coefficients, and
computing total power of filtered coefficients within the signal band to obtain the measured received power in the signal band.

14. The method of claim 1, wherein the estimating the total received power comprises filtering the measured received power in the signal band to obtain the estimated total received power.

15. The method of claim 1, further comprising:
amplifying an analog input signal to obtain an amplified signal having a thermal noise floor higher than quantization noise of an analog-to-digital converter (ADC);
digitizing the amplified signal with the ADC to obtain samples; and
measuring the received power in the sideband based on the samples.

16. The method of claim 1, wherein location of the sideband is selected based on frequency spacing between adjacent CDMA channels.

17. The method of claim 1, further comprising:
estimating interference-over-thermal (IoT) based on the estimated thermal noise.

18. An apparatus for wireless communication, comprising:
at least one processor
to measure received power in a signal band,
to measure received power in a sideband outside of the signal band,
to estimate total received power based on the measured received power in the signal band,
to estimate thermal noise in the signal band based on the measured received power in the sideband, wherein the sideband comprises guard subcarriers and the signal band comprises usable subcarriers among plurality of subcarriers.

19. The apparatus of claim 18, wherein the at least one processor partitions samples into blocks, each block comprising N samples, where N is greater than one, transforms each block of N samples to obtain a corresponding block of N transform coefficients, and computes total power of transform coefficients within the sideband to obtain the measured received power in the sideband.

20. The apparatus of claim 18, wherein the at least one processor filters the measured received power in the sideband to obtain the estimated thermal noise.

21. The apparatus of claim 18, wherein the at least one processor estimates rise-over-thermal (RoT) based on the estimated thermal noise and the estimated total received power.

22. The apparatus of claim 21, wherein the at least one processor partitions samples into blocks, each block comprising N samples, where N is greater than one, transforms each block of N samples to obtain a corresponding block of N transform coefficients, and computes total power of transform coefficients within the signal band to obtain the measured received power in the signal band.

23. The apparatus of claim 21, wherein the at least one processor estimates an available load for a cell based on the estimated RoT, and performs scheduling and admission control based on the available load.

24. An apparatus comprising:
means for measuring received power in a signal band;
means for measuring received power in a sideband outside of the signal band;
means for estimating total received power based on the measured received power in the signal band; and
means for estimating thermal noise in the signal band based on the measured received power in the sideband, wherein the sideband comprises guard subcarriers and the signal band comprises usable subcarriers among plurality of subcarriers.

25. The apparatus of claim 24, wherein the means for measuring the received power in the sideband comprises
means for partitioning samples into blocks, each block comprising N samples, where N is greater than one,
means for transforming each block of N samples to obtain a corresponding block of N transform coefficients, and
means for computing total power of transform coefficients within the sideband to obtain the measured received power in the sideband.

26. The apparatus of claim 24, wherein the means for estimating the thermal noise comprises means for filtering the measured received power in the sideband to obtain the estimated thermal noise.

27. The apparatus of claim 24, further comprising:
means for estimating rise-over-thermal (RoT) based on the estimated thermal noise and the estimated total received power.

28. The apparatus of claim 27, further comprising:
means for estimating an available load for a cell based on the estimated RoT; and
means for performing scheduling and admission control based on the available load.

29. The apparatus of claim 24, wherein the means for measuring the received power in the signal band comprises
means for partitioning samples into blocks, each block comprising N samples, where N is greater than one,
means for transforming each block of N samples to obtain a corresponding block of N transform coefficients, and
means for computing total power of transform coefficients within the signal band to obtain the measured received power in the signal band.

* * * * *